United States Patent [19]

Messina et al.

[11] 4,404,556
[45] Sep. 13, 1983

[54] BIT EXPANSION CIRCUIT

[75] Inventors: Joseph A. Messina, North Andover; William R. Sullivan, Andover, both of Mass.

[73] Assignee: Western Electric Company, Inc., New York, N.Y.

[21] Appl. No.: 325,152

[22] Filed: Nov. 25, 1981

[51] Int. Cl.³ .......................... H04Q 9/00; H04J 3/00
[52] U.S. Cl. ................................ 340/825.03; 370/59; 370/68; 340/825.04
[58] Field of Search ...................... 340/825.03, 825.04, 340/825.02, 825.83; 370/59, 68, 112

[56] References Cited

U.S. PATENT DOCUMENTS

| | | | |
|---|---|---|---|
| 3,761,915 | 9/1973 | Henegar et al. | 340/347 DD |
| 3,924,079 | 12/1975 | Garrett | 370/112 |
| 3,959,596 | 5/1976 | Bojanek et al. | 370/59 |
| 4,032,893 | 6/1977 | Moran | 340/825.83 |
| 4,143,359 | 3/1979 | Beelitz | 340/825.92 |
| 4,176,287 | 11/1979 | Remedi | 307/251 |
| 4,177,455 | 12/1979 | Armstrong et al. | 340/347 DD |

OTHER PUBLICATIONS

The "digital" Logic Handbook, pp. 247-249, 1966-1967 Edition.
Hewlett Packard's Operating and Service Manual for a Multiprogrammer Model 6940B HP Part No. 06940-90005.
Hewlett Packard's Operating and Service Manual for an Open Collector Output Card Model 69332A HP Part No. 69332-90001.

Primary Examiner—Donald J. Yusko
Attorney, Agent, or Firm—J. B. Hoofnagle; H. St. Julian

[57] ABSTRACT

A n-bit parallel output port of a programmable controller (22) is coupled to a bit expansion circuit (24). A plurality of channel-select bits are decoded by a multiplexer board (26) to select and enable any one of sixteen output channels. A plurality of line-select bits are fed to a memory section (28) to facilitate the selection of any one of a plurality of output lines associated with the enabled channel. The selected output line remains latched in their most recent output state when the selected channel is disabled by the controller (22).

16 Claims, 5 Drawing Figures

BIT EXPANSION CIRCUIT

TECHNICAL FIELD

This invention relates to a bit expansion circuit and particularly to a circuit for increasing the number of outputs available from a n-bit parallel output port of a programmable controller.

BACKGROUND OF THE INVENTION

In many manufacturing operations, a programmable controller is used to control a plurality of different processes or devices either independently or simultaneously. Usually each device is connected through a driver circuit to a bit of an output port of the controller. Often times the number of devices and processes to be controlled exceed the number of bits available on the output port. Therefore to accommodate the additional devices or processes, (1) additional controllers may be used, (2) the controller may be replaced by one having a larger output port or (3) an interface system, which couples to the output port of the controller, is used to expand the number of devices or processes that can be controlled.

One known complex and expensive interface system representative of the state of the art includes a multiprogrammer and an interface circuit. A plurality of cards, which are insertable into the multiprogrammer, are necessary to configure the multiprogrammer and the interface circuit into a system which expands the number of devices or processes which can be controlled. In order for this system to work properly, the interface circuit must be coupled to an output port which is bus compatible with the standards established by the Institute of Electrical and Electronic Engineers (I.E.E.E.).

Consequently, there is a need for an interface system which is inexpensive and which will operate from a parallel output port of the controller.

SUMMARY OF THE INVENTION

This invention relates to a bit expansion circuit for increasing the number of outputs available from a n-bit parallel output port of a programmable controller. The bit expansion circuit includes means for coupling the output port of the programmable controller to the bit expansion circuit. The bit expansion circuit also includes a plurality of output channels each having a plurality of output lines wherein the total number of output lines of the plurality of channels exceeds the number of outputs available from the n-bit parallel output port. A first means is provided for decoding a plurality of channel-select bits fed from the programmable controller through the coupling means to the bit expansion circuit to select and enable any one of the plurality of output channels. A second means, which is responsive to the enabling of the channel by the first decoding means, is provided for decoding a plurality of line-select bits fed from the programmable controller through the coupling means to the bit expansion circuit to select and enable any one of the plurality of output lines associated with the output channel enabled by the first decoding means. Additional means is provided for latching the selected output line in the most recent output state when the first decoding means disables the selected channel.

DETAILED DESCRIPTION

Figure 1:
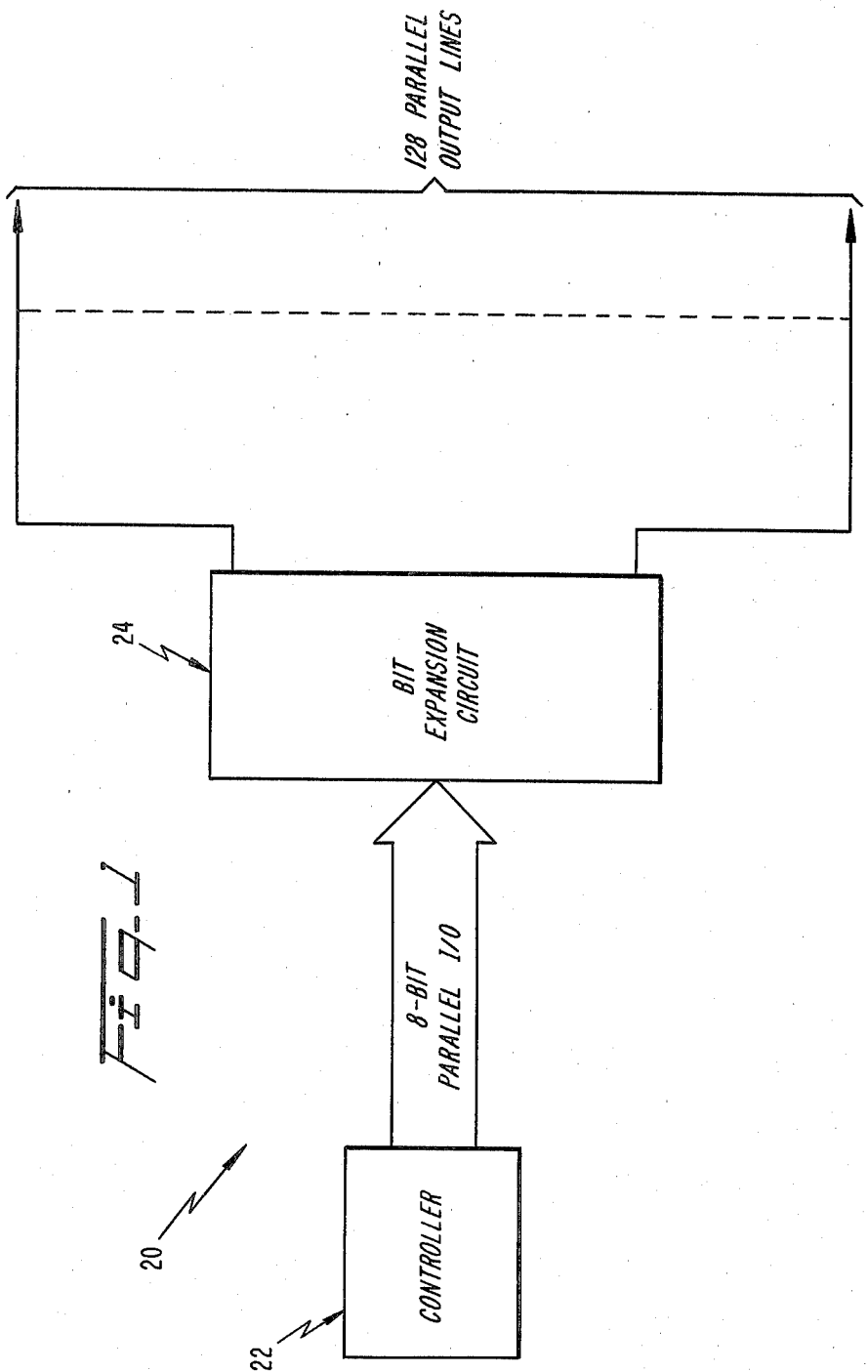
FIG. 1 is a block diagram of an interface system in accordance with certain principles of the invention.

Referring to FIG. 1, there is illustrated a block diagram of an interface system, designated generally by the numeral 20. The system 20 includes a programmable controller 22 and a bit expansion circuit, designated generally by the numeral 24. The controller 22 includes two output ports: (1) an eight-bit parallel port and (2) an eight-bit I.E.E.E. bus-compatible port. In a typical manufacturing environment, some devices (not shown) and processes to be controlled are not susceptible of being controlled through the I.E.E.E. bus-compatible port. Therefore these devices and processes must be controlled through the parallel port. The bit expansion circuit 24, which is coupled to the parallel port, enables 128 different devices and processes to be controlled independently and simultaneously. The controller 22, which operates under stored program control, facilitates the activation of one or a plurality of the devices or processes each coupled to one of a 128 parallel output lines of the bit expansion circuit 24.

The controller 22 which performs in the foregoing manner is commercially available from Commodore International Inc. of Santa Clara, Calif. and is identified as a Model 2001.

BIT EXPANSION CIRCUIT 24

Figure 2:
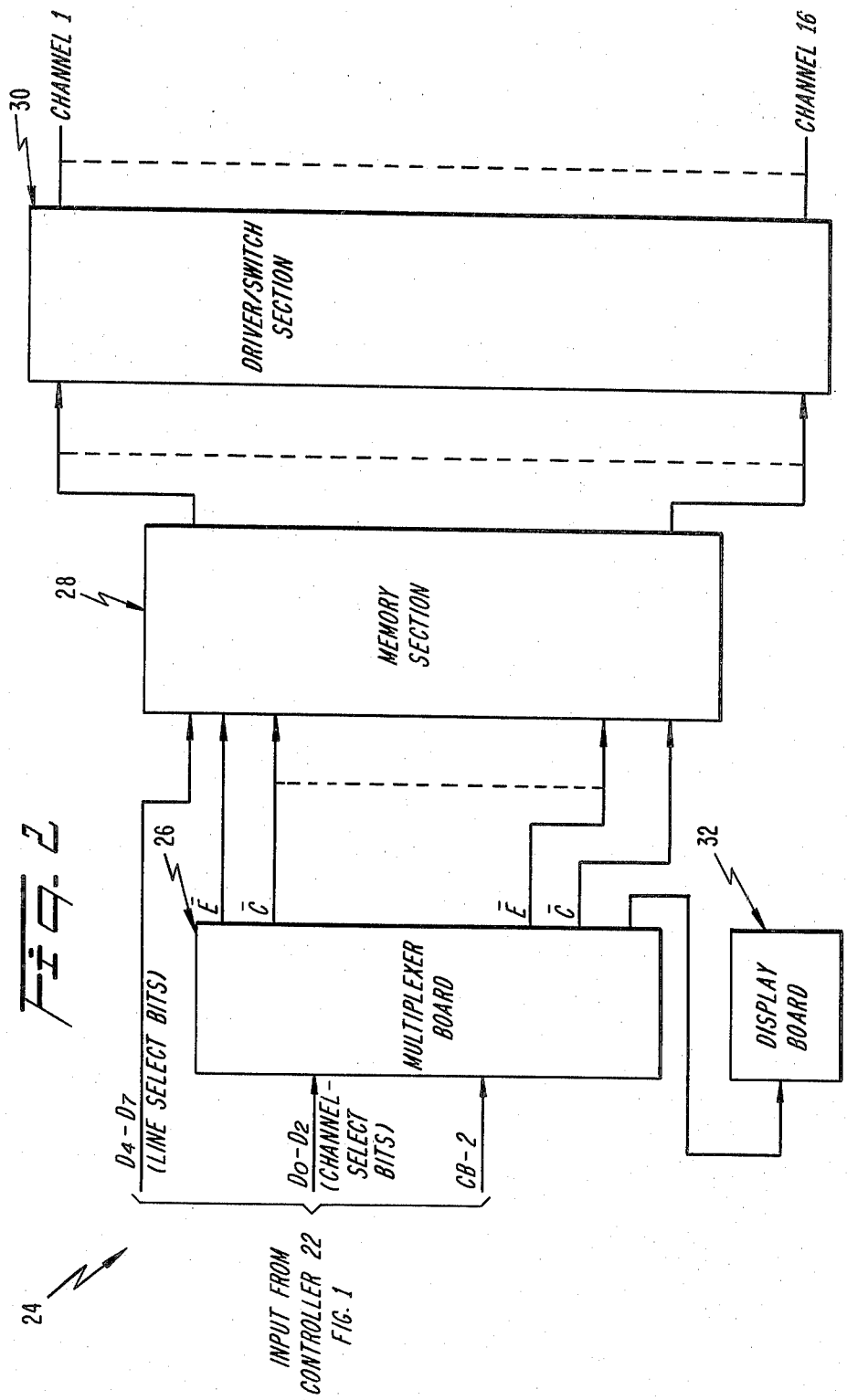
FIG. 2 is a block diagram of a bit expansion circuit in accordance with certain principles of the invention.

Referring to FIG. 2, there is illustrated a block diagram of the bit expansion circuit 24. The bit expansion circuit 24 includes a multiplexer board, designated generally by the numeral 26, a memory section, designated generally by the numeral 28, a driver/switch section, designated generally by the numeral 30, and a display board, designated generally by the numeral 32. As noted above, the bit expansion circuit 24 expands the eight-bit parallel output port of the controller 22 into 128 parallel output lines. The 128 output lines are divided into sixteen channels, numbered 1 through 16, wherein each channel includes eight parallel lines. Each of the sixteen channels, 1 through 16, operates independently of the others. Four bits of the eight-bit port, hereinafter referred to as channel-select bits, are fed to the multiplexer board 26 to select one of the sixteen channels, 1 through 16. A programmable clear signal (CB-2), which is generated by the controller 22, is also fed to the multiplexer board 26. The channel-select bits and the programmable clear signal (CB-2) facilitates the generation of a clear signal ($\overline{C}$) and an enable signal ($\overline{E}$) for clearing and testing the selected one of the channels 1 through 16. The clear signal ($\overline{C}$) and enable signal ($\overline{E}$) are thereafter fed to the memory section 28 to enable the memory section which is associated with the selected one of the channels 1 through 16. The multiplexer board 26 also generates a signal to the display board 32. The display board 32 provides a visual indication of the channel selected by the channel-select bits.

The remaining four bits of the eight-bit port, hereinafter referred to as line-select bits, are fed to the memory section 28. The line-select bits include a three-bit address code to select one of the eight output lines associated with the channel selected by the channel-select bits. Moreover, the line-select bits include an additional bit which activates or deactivates the selected line within the selected channel.

MULTIPLEXER BOARD 26

Figure 3:
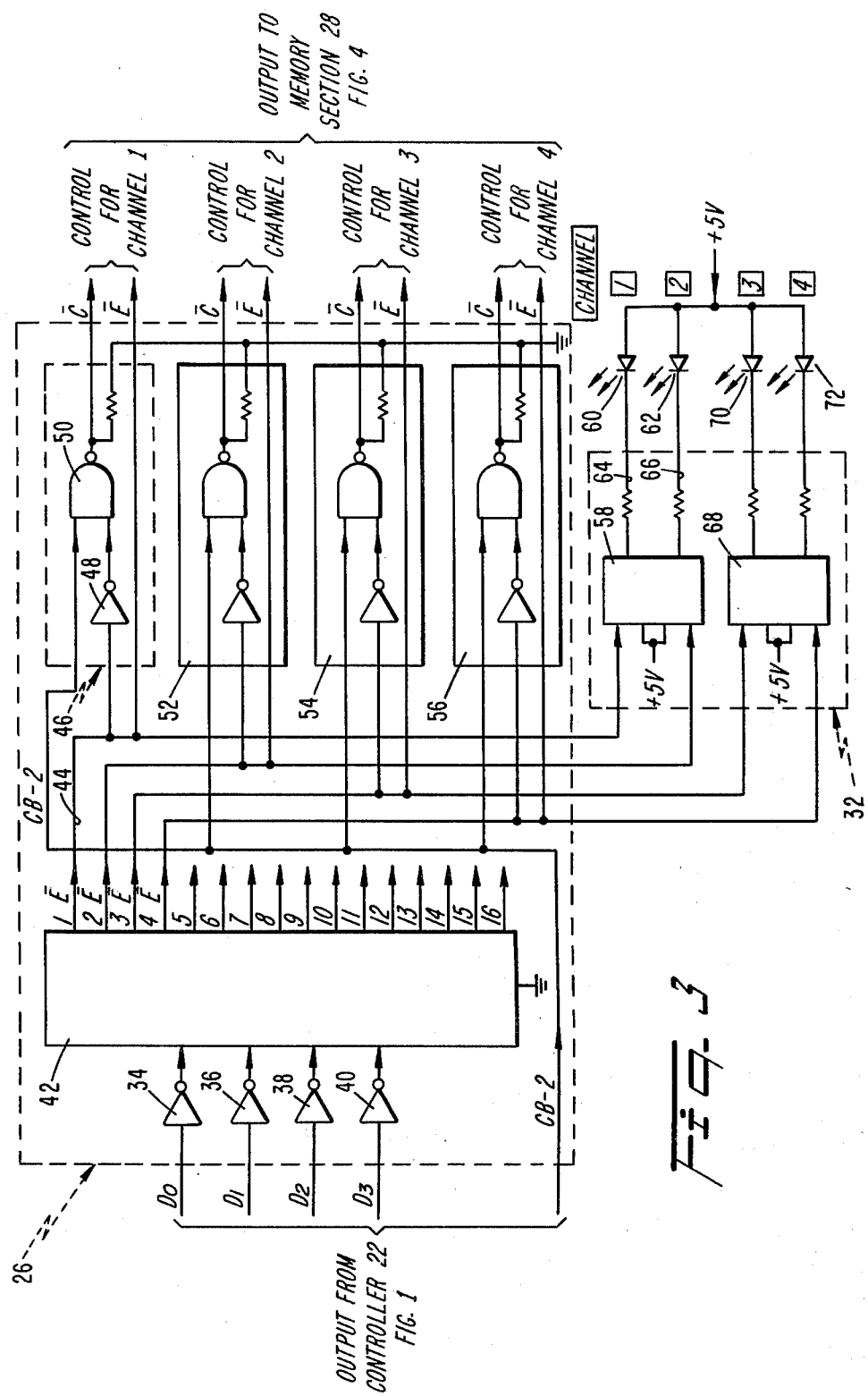
FIGS. 3 through 5 are schematic diagrams of the bit expansion circuit of FIG. 2.

Referring to FIG. 3, the multiplexer board 26 includes inverters 34, 36, 38 and 40 and a decoder/demultiplexer circuit 42. The channel-select bits are fed through inverters 34, 36, 38 and 40 to a plurality of inputs of circuit 42. Circuit 42 decodes the four binary-coded inputs into one of sixteen mutually exclusive outputs. Each of the sixteen channels, 1 through 16, is associated with one of the outputs of circuit 42. When one of the sixteen channels, 1 through 16, is selected, a low-level signal, which is the enable signal ($\overline{E}$), appears on the output associated with the selected channel. A high-level signal appears on all of the remaining outputs. This insures that only one channel can be enabled at a time. Moreover, the selected output of circuit 42 remains enabled until the controller 22 (FIG. 1) changes the channel-select bits.

Figure 4:
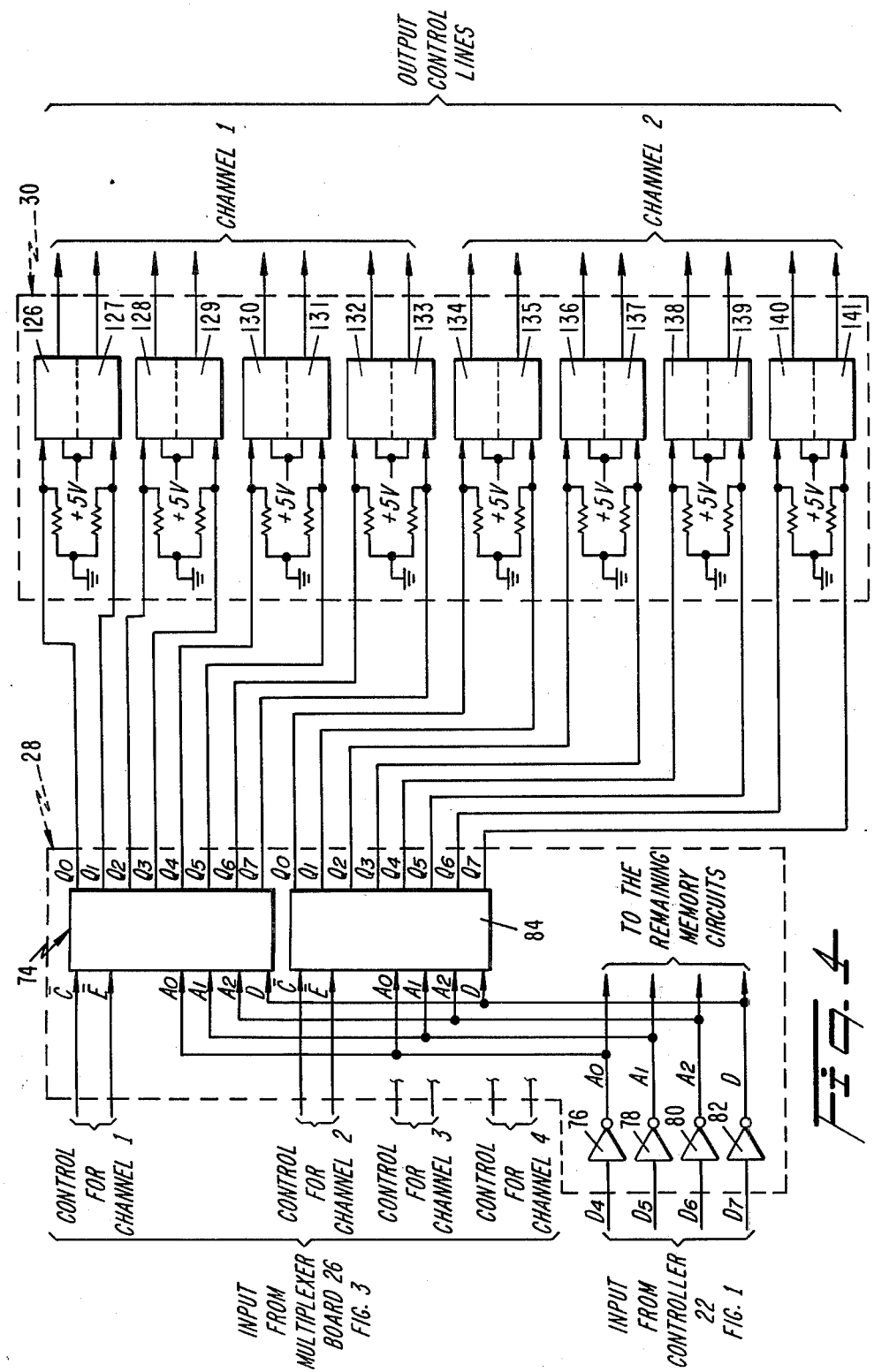

The enable signal ($\overline{E}$), which is associated with channel 1 and which appears on output line 44, is fed to an output circuit, designated generally by the numeral 46. The output circuit 46 includes an inverter 48 and a NAND gate 50. The programmable clear signal (CB-2) is applied to one input of NAND gate 50. The clear signal ($\overline{C}$), which is a low-level signal, only appears on the output of NAND gate 50 whenever the enable signal ($\overline{E}$) is in a low state and the programmable clear signal (CB-2) is in a high state. The clear signal ($\overline{C}$) is a high-level signal for all of the other combinations of the enable ($\overline{E}$) signal and the programmable clear signal (CB-2). The enable signal ($\overline{E}$) and clear signal ($\overline{C}$) are then fed to the memory section 28 (FIGS. 2 and 4). Output circuits 52, 54 and 56 associated with channels 2, 3 and 4, respectively, perform in a manner similar to the one described above for output circuit 46. Moreover, the multiplexer board 26 includes twelve additional output circuits (not shown) identical to output circuit 46 which are associated with channels 5 through 16.

The decoder/demultiplexer circuit 42 which performs in the foregoing manner is commercially available as type SN74154N and identified as a 4-line-to-16-line decoder/demultiplexer.

DISPLAY BOARD 32

The enable signals ($\overline{E}$) associated with channels 1 and 2 are fed to driver circuit 58 of display board 32. Light-emitting diodes 60 and 62 coupled to output lines 64 and 66 of the driver 58 provide a visual indication when channels 1 and 2, respectively, are enabled. Diodes 60 and 62 will remain illuminated until the controller 22 (FIG. 1) changes the channel-select bits. Driver circuit 68 and diodes 70 and 72 associated with channels 3 and 4, respectively, perform in a manner similar to that described above for driver circuit 58 and diodes 60 and 62. The display board 32 includes six additional drivers (not shown) and twelve additional diodes (not shown) which are associated with channels 5 through 16 and perform in a manner similar to that described above.

Driver circuits 58 and 68 which perform in the foregoing manner are commercially available as type SN75451B and identified as dual peripheral positive AND drivers.

MEMORY SECTION 28

Referring to FIG. 4, the enable signal ($\overline{E}$) and clear signal ($\overline{C}$), which were generated by the multiplexer board 26 (FIGS. 2 and 3) and which are associated with channel 1, are fed to a memory circuit, designated generally by the numeral 74 in memory section 28. Moreover, the line-select bits, which are generated by the controller 22 (FIG. 1), are fed to inverters 76, 78, 80 and 82. The inverted line-select bits are fed to three address inputs (A0, A1 and A2) and a data input (D) of the memory circuit 74. The bits appearing on the address inputs (A0, A1 and A2) facilitate the selection of one of eight output lines associated with the memory circuit 74. The bit which appears on the data input (D) provides a level which switches a selected line on or off and which facilitates the simultaneous clearing or activating of all eight output lines associated with the enabled channel 1. The inverted line-select bits are also fed to memory circuit 84, which is associated with channel 2 and to fourteen additional memory circuits (not shown) which are associated with channels 3 through 16.

MEMORY CIRCUIT 74

Figure 5:
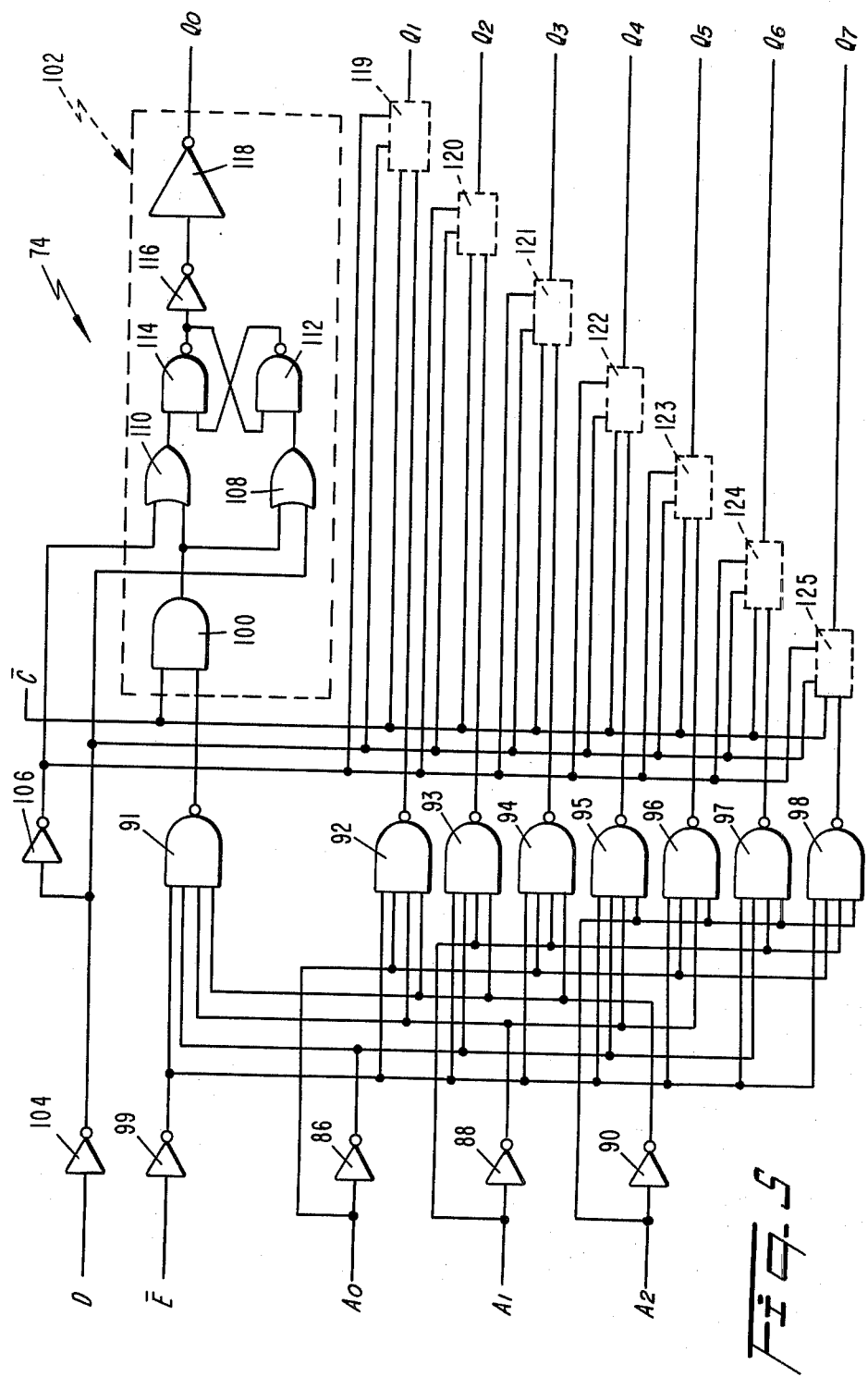

Referring to FIG. 5, a detailed schematic of the memory circuit 74 is illustrated therein. The memory circuit 74 includes inverters 86, 88 and 90 which are coupled to the address inputs (A0, A1 and A2). Signals or address codes appearing on the address inputs (A0, A1 and A2) represent the binary equivalents of decimal digits 0 through 7 and are coupled to NAND gates 91 through 98, respectively. For example, all of the inverted address input are coupled to NAND gate 91 which represents address 0 and all of the address inputs in their uncomplemented form are coupled to NAND gate 98 which represents address 7. The enable signal ($\overline{E}$), which is generated by the multiplexer board 26 (FIGS. 2 and 3), is fed through inverter 99 to an input of each of the NAND gates 91 through 98.

For purposes of illustration, only that portion of circuit 74 associated with address 0 will be explained in detail. The output of NAND gate 91 is coupled to one input of an AND gate 100 which is a part of a memory output circuit, designated generally by the numeral 102. The clear signal ($\overline{C}$) is coupled to a second input of AND gate 100. The data input (D) is coupled through inverter 104 to OR gate 108 and through inverters 104 and 106 to OR gate 110. The output of AND gate 100 is coupled to one input of OR gates 108 and 110. The output of OR gate 108 is coupled to one input of NAND gate 112. The output of OR gate 110 is coupled to one input of NAND gate 114. The output of NAND 112 is coupled to a second input of NAND gate 114 and the output of NAND gate 114 is coupled to a second input of NAND gate 112. The output of NAND gate 114 is also coupled to an inverter 116. The output of inverter 116 is coupled to inverter 118 which is coupled to output line 0 of channel 1.

The memory circuit 74 further includes output circuits 119 through 125 which are associated with addresses 1 through 7, respectively. Output circuits 119 through 125 operate in a manner similar to output circuit 102 described above.

The memory circuit 74 operates in (1) a clear mode, (2) an addressable mode and (3) a memory mode. The memory circuit 74 will accept data only when its enable signal ($\overline{E}$) is in a low state. Moreover, only during this time can the output lines be cleared, tested or switched on or off. Whenever the memory circuit 74 is disabled, all of the output lines remain latched in their most recent state.

The clear mode facilitates the simultaneous enablement of all of the output lines associated with the memory circuit 74. This determines whether all of the output lines are operating properly. Thereafter, all of the output lines are cleared which returns each to a deactivated state. The clear mode is enabled whenever the clear signal ($\overline{C}$) is in a low state. When the clear signal ($\overline{C}$) is in the low state, the signal appearing on the data input (D) facilitates the testing or clearing of all of the output lines. For purposes of illustration, assume that the signal appearing on the data input (D) is in a high state, all eight of the output lines associated with the enabled one of the sixteen channels, 1 through 16, are switched to a low state. This low state appearing on each of the output lines is fed through the driver/switch section 30 (FIGS. 2 and 4) and activates the devices controlled by the output lines. This procedure tests simultaneously all eight of the output lines associated with the memory circuit 74. If the signal appearing on the data input (D) is in a low state, all eight of the output lines are switched to a high state. This high state appearing on each of output lines unlatches any of the output lines previously latched and thereby insures the deactivation of the devices controlled by the output lines. This procedure clears simultaneously all eight of the output lines.

The address mode switches the state of an output line addressed by signals appearing on the address inputs (A0, A1 and A2). In this mode, the enable signal ($\overline{E}$) is in a low state and the clear signal ($\overline{C}$) is in a high state. The address code appearing on the address inputs (A0, A1 and A2) selects one of the eight outputs associated with memory circuit 74. Once an output line has been selected, the state of the signal appearing on the data input (D) switches the selected output line on or off. If the signal appearing on the data input (D) is in a high state, a low-level signal appears on the selected output line and facilitates the activation of the devices associated therewith. However, if the signal appearing on the data input (D) is in a low state, a high-level signal appears on the selected output line and facilitates the deactivation of the devices associated therewith. When the address code is changed by the controller 22 (FIG. 1) to select a different output line, the previously selected output line remains in its most recent state. For purpose of illustration, assume that the address code facilitates the selection of output line 2 and a high-level signal on the data input (D) activates the device associated therewith. Thereafter, the address code is changed to facilitate the selection of output line 6. The device associated with output line 2 will remain in the activated state. Thus, all eight output lines of the enabled channel can be switched on or off and will remain latched in their most recent state.

Subsequently, when a different channel is selected, such as channel 2 which is associated with memory circuit 84, the enable signal ($\overline{E}$) for channel 1 becomes a high-level signal and memory circuit 74 is disabled. As noted above, memory circuit 76 will then operate in the memory mode. The output lines associated with memory circuit 74 remain latched in their respective most recent output state. The memory circuit 74 "remembers" which output lines were activated and which are deactivated. The memory mode is the disabled state of the memory circuit 74 and occurs when the enable signal ($\overline{E}$) and the clear signal ($\overline{C}$) are in a high state. Signals which appear on the address inputs (A0, A1 and A2) and the data input (D) during the disabled state are ignored. Thus, the output lines of memory circuit 74 will remain latched in their appropriate output state until the memory circuit is re-enabled and the on-off state of the selected output lines is changed.

DRIVER/SWITCH SECTION 30

Referring again to FIG. 4, the output lines of memory circuit 74, which are associated with channel 1, are fed to inputs of peripheral AND driver circuits 126 through 133 which are included in driver/switch section 30. A five volt signal is coupled to a second input of each of the driver circuits 126 through 133. When the signal received from the memory circuit 74 is a high-level signal, a high-level signal appears on an output control line of the appropriate one of driver circuits 126 through 133. As noted above, this represents the off state and the device controlled by the output control line is switched off. However, if the signal received from the memory circuit 74 is a low-level signal, a low-level signal appears on an output control line of the appropriate one of driver circuits 126 through 133. As noted above, this represents the on state and the device controlled by the output control line is switched on.

The output lines of memory circuit 84, which are associated with channel 2, are fed to driver circuits 134 through 141. Moreover, the driver/switch section 30 includes four dual drivers (not shown) for each of the remaining channels 3 through 16. Drivers 126 through 141, which perform in the foregoing manner, are the same type as drivers 58 and 68 described above.

SUMMARY

In summary, the interface system 20 (FIG. 1), which is coupled to the eight-bit parallel port of the controller 22 (FIG. 1), facilitates the control of any one or a combination of a plurality of devices, for example, 128 devices, coupled to the output control lines. The system 20 utilizes four bits of the eight-bit parallel port as channel-select bits to facilitate the selection of one of sixteen channels, 1 through 16, by the multiplexer board 26 (FIGS. 2 and 3). The selection of one of the sixteen channels, 1 through 16, facilitate the generation of an enable signal ($\overline{E}$) and a clear signal ($\overline{C}$). The enable signal ($\overline{E}$) and clear signal ($\overline{C}$) are fed to the memory section 28. The system 20 utilizes the remaining four bits of the eight-bit port as line-select bits to select one of sixteen memory circuits, such as memory circuit 74. After the appropriate memory circuit has been enabled by the multiplexer board 26, the line-select bits facilitate (1) the selection of an output line of the enable memory circuit and (2) activation or deactivation of the selected output line. The output lines of each of the plurality of memory circuits, such as 74, are coupled to the driver/switch board 30. The driver/switch board 30 in response to output states appearing on the output lines, facilitates the activation or deactivation of the devices coupled to its output control lines which is associated with the selected output line.

What is claimed is:

1. A bit expansion circuit for increasing the number of outputs available from a n-bit parallel output port of a programmable controller, comprising:
    means for coupling the output port of the programmable controller to the bit expansion circuit;
    a plurality of output channels each having a plurality of output lines wherein the total number of output lines of the plurality of channels exceeds the number of outputs available from the n-bit parallel output port;

a first means for decoding a plurality of channel-select bits fed from the programmable controller through the coupling means to the bit expansion circuit to select and enable any one of the plurality of output channels;

a second means for decoding a plurality of line-select bits fed from the programmable controller through the coupling means to the bit expansion circuit to select and enable any one of the plurality of output lines associated with the output channel enabled by the first decoding means; and means for latching the output line selected by the second decoding means in the most recent output state when the first decoding means disables the selected channel.

2. The bit expansion circuit as set forth in claim 1 wherein the first decoding means includes:

means for enabling sequentially the plurality of output channels so that only one output channel is enabled at one time; and wherein the second decoding means includes:

means for enabling simultaneously all of the output lines associated with the sequentially enabled output channel; and wherein the latching means includes:

means for latching all of the simultaneously enabled output lines in their most recent output state when the sequentially enabled output channel becomes disabled.

3. The bit expansion circuit as set forth in claim 1 wherein the first decoding means includes:

means responsive to the channel selection by the first decoding means for generating enable signals for the selected output channel; and means for feeding the enable signals to the second decoding means to enable the output channel selected by the first decoding means.

4. The bit expansion circuit as set forth in claim 1 which further comprises means, responsive to the output state appearing on the output line selected by the second decoding means, for controlling a device coupled to an output control line associated with the selected output line of the selected channel.

5. The bit expansion circuit as set forth in claim 1 which further comprises means for visually indicating the output channel selected by the first decoding means.

6. The bit expansion circuit as set forth in claim 1 wherein the first decoding means includes a demultiplexer having plurality of outputs.

7. The bit expansion circuit as set forth in claim 1 wherein the second decoding means includes a plurality of memory circuits each of which is associated with one of the plurality of output channels and each having a plurality of the output lines associated therewith.

8. The bit expansion circuit as set forth in claim 2 which further comprises means for simultaneously testing all of the output lines associated with the sequentially enabled channel.

9. The bit expansion circuit as set forth in claim 4 wherein the controlling means includes a plurality of driver circuits each of which is coupled to one of the plurality of output lines.

10. A bit expansion circuit for increasing the number of outputs available from a n-bit parallel output port of a programmable controller, comprising:

means for coupling the output port of the programmable controller to the bit expansion circuit;

a plurality of output channels each having a plurality of output lines wherein the total number of output lines exceeds the number of outputs available from the n-bit parallel output port;

a demultiplexer having a plurality of outputs wherein each of the outputs is associated with one of the plurality of output channels and for selecting any one of the output channels;

a first means for feeding a plurality of channel-select bits from the programmable controller through the coupling means to the demultiplexer to select any one of the plurality of output channels;

means, responsive to the channel selection by demultiplexer, for generating enable signals for the selected output channels;

a plurality of memory circuits each of which is associated with one of the plurality of output channels and for selecting any one of a plurality of the output lines associated therewith;

a second means for feeding a plurality of line-select bits from the programmable controller through the coupling means to the plurality of memory circuits to select any one of the plurality of output lines associated with the selected output channel;

a third means for feeding the enable signal to the memory circuit associated with the selected output channel to enable the output channel selected by the demultiplexer; and means for latching the selected output line in the most recent output state when the demultiplexer disables the selected output channel.

11. The bit expansion circuit as set forth in claim 10 wherein the demultiplexer includes:

means for enabling sequentially the plurality of output channels so that only one output channel is enabled at one time; and wherein each of the plurality of memory circuits includes:

means for enabling simultaneously all of the output lines associated with the sequentially enabled output channel; and wherein the latching means includes:

means for latching all of the simultaneously enabled output lines in their most recent output state when the sequentially enabled output channel becomes disabled.

12. The bit expansion circuit as set forth in claim 10 wherein the demultiplexer includes:

means responsive to the channel selection by the demultiplexer for generating enable signals for the selected output channel; and a third means for feeding the enable signals to the memory circuits associated with the selected channel to enable the output channel selected by the demultiplexer.

13. The bit expansion circuit as set forth in claim 10 which further comprises means, responsive to the output line selected by the memory circuit associated with the selected channel, for controlling a device coupled to an output control lines associated with the selected output line.

14. The bit expansion circuit as set forth in claim 10 which further comprises means for visually indicating the output channel selected by the demultiplexer.

15. The bit expansion circuit as set forth in claim 11 further includes means for simultaneously testing all of the output lines associated with the selected output channels.

16. The bit expansion circuit as set forth in claim 13 wherein the controlling means includes a plurality of driver circuits each of which is coupled to one of the plurality of output lines.

* * * * *